United States Patent
Robshaw et al.

(10) Patent No.: US 8,458,474 B2
(45) Date of Patent: Jun. 4, 2013

(54) METHOD OF AUTHENTICATING AN ENTITY BY A VERIFICATION ENTITY

(75) Inventors: Matthew Robshaw, Paris (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 514 days.

(21) Appl. No.: 12/600,304

(22) PCT Filed: May 21, 2008

(86) PCT No.: PCT/FR2008/050879
§ 371 (c)(1),
(2), (4) Date: Nov. 16, 2009

(87) PCT Pub. No.: WO2008/149031
PCT Pub. Date: Dec. 11, 2008

(65) Prior Publication Data
US 2010/0161988 A1 Jun. 24, 2010

(30) Foreign Application Priority Data
May 23, 2007 (FR) ...................... 07 55216

(51) Int. Cl.
*H06F 15/16* (2006.01)
(52) U.S. Cl.
USPC ........... 713/170; 713/161; 713/176; 713/180; 380/30; 380/28; 380/29; 380/46
(58) Field of Classification Search
USPC ..... 713/161, 170, 189; 380/30, 285; 382/117, 382/118
See application file for complete search history.

(56) References Cited

U.S. PATENT DOCUMENTS

| 5,483,597 | A * | 1/1996 | Stern ................................ 380/30 |
| 7,269,277 | B2 * | 9/2007 | Davida et al. ................. 382/117 |
| 2005/0159942 | A1 * | 7/2005 | Singhal ......................... 704/219 |
| 2007/0033417 | A1 * | 2/2007 | Gammel et al. .............. 713/189 |

OTHER PUBLICATIONS

"A Note on a Lower Bound for Generalized Hamming Weights"—Shibuya et al IEICE Dec. 2001 http://www.ts-lab.net/members/tshibuya/pdf/e84-a_12_3138.pdf.*
"Hamming Weight" Lauradoux Cedric Feb. 2009 http://perso.citi.insa-lyon.fr/claurado/ham/overview.pdf.*
Juels et al., "Authenticating Pervasive Devices with Human Protocols," Advances in Cryptology—Crypto 2005 Lecture Notes in Computer Science, LNCS, Springer-Verlag, BE, vol. 3621, pp. 293-308 (2005).
Munilla et al., "HB-MP: A further step in the HB-family of lightweight authentication protocols," Computer Networks, Elsevier Science Publishers B.V., Amsterdam, NL, vol. 51 (9), pp. 2262-2267 (Apr. 29, 2007).
Piramuthu et al., "Protocols for RFID tag/reader authentication," Decision Support Systems, Elsevier Science Publishers, Amsterdam, NL, vol. 43 (3), pp. 897-914 (Mar. 27, 2007).

* cited by examiner

*Primary Examiner* — Krista Zele
*Assistant Examiner* — Randy Scott
(74) *Attorney, Agent, or Firm* — Drinker Biddle & Reath LLP

(57) ABSTRACT

A method of authenticating an entity by a verification entity, said entities sharing a pair of secret keys X and Y which are n×m (n, m>i) binary matrices. The method may be applied to cryptographic protocols for authenticating electronic chips at a very low cost.

10 Claims, 3 Drawing Sheets

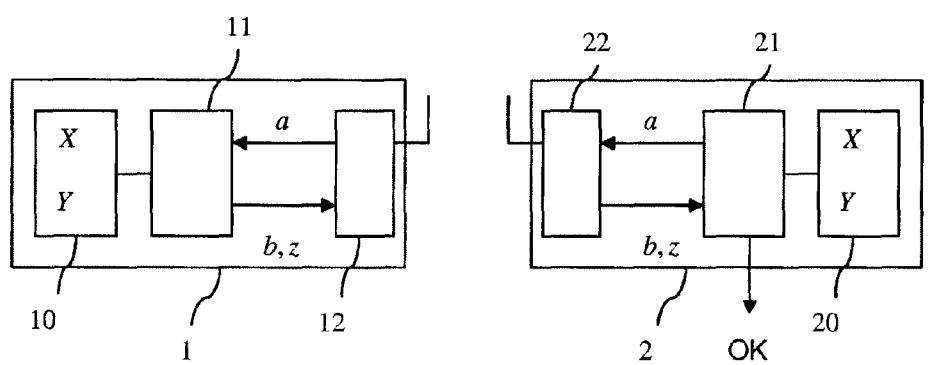

METHOD OF AUTHENTICATING AN ENTITY BY A VERIFICATION ENTITY

CROSS-REFERENCE TO RELATED APPLICATIONS

This application is the U.S. national phase of the International Patent Application No. PCT/FR2008/050879 filed May 21, 2008, which claims the benefit of French Application No. 07 55216 filed May 23, 2007, the entire content of which is incorporated herein by reference.

FIELD OF THE INVENTION

The present invention relates to a method of authenticating an entity by a verification entity.

The invention finds a particularly advantageous application in the field of cryptographic protocols for authenticating electronic microchips of very low cost, with or without contact, in particular radio-frequency identification (RFID) tags.

BACKGROUND OF THE INVENTION

Low-cost electronic microchips, for example of the RFID type, are used in many applications such as labeling or tracking objects (medication, library books, etc.) and producing and verifying electronic tickets, such as public transport tickets.

Regardless of the application concerned, it is necessary to prevent fraud by counterfeiting the microchips, in particular copying or cloning them or replaying the data that they transmit. To protect the applications against such attacks, it is imperative to authenticate microchips when they interact with a microchip reader.

However, any authentication protocol used between an entity to be authenticated, such as a low-cost microchip, and the verification entity, such as a microchip reader, must take into account the extremely limited computation resources of microchips of this type, which are usually of the hard-wired logic type.

The symmetrical HB+ (Hopper-Blum) authentication protocol specifically designed to meet the requirements of RFID microchips has recently been proposed (see A. Juels and S. A. Weis, *"Authenticating Pervasive Devices with Human Protocols"*, in V. Shoup, Editor, Advances in Cryptology-Crypto 05, Lecture Notes in Computer Science, Vol. 3126, pp. 293-308, Springer Verlag).

FIG. 1 represents exchange of data under the HB+ protocol between the entity to be authenticated and the verification entity.

As can be seen in this figure, the entity to be authenticated, for example an RFID microchip, and the verification entity, for example a microchip reader, share a pair of secret keys $x$ and $y$ consisting of binary vectors of n bits. These secret keys are stored in storage means 10 of the microchip and storage means 20 of the microchip reader.

The HB+ protocol unfolds over r successive iterations. On each iteration, the microchip draws at random (block 100) and sends (1) the microchip reader a binary vector $b$ of n bits. Similarly, the microchip reader draws at random (block 200) and sends (2) the microchip a binary vector $a$ of n bits. The random drawing of the vectors $b$ and $a$ is effected in accordance with a uniform probability law.

The microchip then responds to the challenge $a$ launched by the microchip reader by calculating (block 120) and sending it (3) a response affected by noise $z = a \bullet x \oplus b \bullet y \oplus v$, where $\bullet$ represents the modulo 2 scalar product operation and $\oplus$ represents modulo 2 addition. A noise bit $v$ is drawn at random by the microchip (block 110); it takes the value 1 with a probability $\eta < \frac{1}{2}$ and the value 0 with a probability $(1-\eta)$.

The microchip reader rejects the current iteration (block 210) if the response $z$ received does not satisfy the equation $z = a \bullet x \oplus b \bullet y$; in this situation, a counter of the number nbr of rejected iterations is incremented by one unit (block 220). At the end of the r iterations, counted by a counter of the number nbt of iterations (block 250), the authentication is accepted (block 240) if and only if the number nbr of rejected iterations from the counter is below a given threshold t (block 230). The value of t is of course a function of the probability $\eta$; a simple value of t is for example $t = r \times \eta$.

Although the exchanges of the proposed HB+ protocol are structured in r iterations of three passes, it is possible to reduce this to one exchange of three passes by calculating and sending r values of b, a, and z at the same time.

The advantage of the HB+ protocol is the great simplicity of the authentication calculations.

Moreover, its robustness stems from the difficulty of the LPN (Learning Parity with Noise) problem of finding a solution to a linear system with noise. Finally, compared to the historically earlier HB protocol that differs from it in that the response with noise comprises no term $b \bullet y$, the HB+ protocol has the benefit that the masking effect induced by the binary vector $b$ is coupled to the secret key $y$; the HB protocol was sensitive to attacks in which the adversary sends constant challenges $a$ and listens to the responses from the microchip reader; the most frequent response being $a \bullet x$, and $a$ being known, it was possible in a first step to obtain $a \bullet x$ for a sufficient number of values of $a$ and in a second step to deduce $x$ by solving a linear system.

However, the HB+ protocol has drawbacks that prevent it from being used effectively in practice.

As already indicated, a first drawback is that although this protocol is resistant to some active attacks on $a$, it nevertheless remains vulnerable to other attacks encountered when an adversary has access to the result (success/failure) of a plurality of successive authentications.

Such an attack intercepts the challenge $a$ when sent from the microchip reader to the microchip and modifies its bits successively. For example, if the first bit of $a$ is modified, it is clear that if the result is not changed after this modification it can be concluded that the first bit of the secret vector $x$ is likely to be 0. Conversely, if the result is changed, the first bit of $x$ is probably equal to 1. To obtain all of the n bits of $x$, it suffices to modify the second bit of $a$ to discover the second bit of $x$, and so on up to bit n.

A second drawback of the HB+ protocol is that it produces an excessive number of false alarms, a false alarm being defined as refusal to authenticate a legitimate microchip. With the following values: n=224 bits, $\eta=0.25$, r=100 iterations and $t = \eta \times r = 25$, for example, the false alarm rate is 45%, which is totally unacceptable. The false positives rate, i.e. successful authentication of chips responding at random, is close to $3 \times 10^{-7}$.

If instead of taking for t the expected value $t = \eta \times r = 25$, a higher value is taken, for example 35, the false alarm rate falls to 1%, which remains unacceptable, but the false positive rate increases to approximately $1.7 \times 10^{-3}$.

Finally, a third drawback of HB+ is the excessive complexity to which it leads in communication between the microchip and the microchip reader. With the same numerical values as before, it can be shown that is necessary to exchange 44 900 bits on each authentication, i.e. 224 bits for b, 224 bits a, and one bit for the result z in each of the 100 iterations.

Even with a bit rate of 10 000 bps, the microchip reader requires more than four seconds to authenticate a microchip, which is prohibitive in terms of system ergonomics, not to mention the resulting problem of supplying power to the microchip.

SUMMARY OF THE INVENTION

The invention therefore provides a method of authenticating an entity by a verification entity, said entities sharing a pair of secret keys X and Y. Said method is notable in that said secret keys X and Y are n×m (n, m>1) binary matrices and in that it includes steps repeated r times (r≧1) of:

the entity to be authenticated and the verification entity exchanging binary vectors a and b of n bits respectively drawn at random by the verification entity and the entity to be authenticated and the entity to be authenticated drawing at random a noise binary vector c of m bits, each of said m bits being equal to 1 with a probability η less than ½, and calculating and sending to the verification entity a response vector z of m bits equal to z=aX⊕bY⊕c;

the verification entity calculating the Hamming weight of an error vector e=z⊕aX⊕bY; and then accepting the authentication if the Hamming weights of the r error vectors e satisfy a relationship of comparison to a parameter that is a function of the probability η.

Thus it can be seen that, compared to the HB+ protocol, the method of the invention offers improved resistance to attacks that modify bits of the challenge a with a view to reconstituting the secret X. If the first bit of a is modified, that modification affects the products of that bit with the first bits of the m columns of X, which also affects the m bits of the product aX and therefore the response z in its entirety. Consequently, it is not possible to deduce, from observing the effect on the authentication result of a modification of bits of a, any information about the secret X because a plurality of the m bits of z can be modified without it being possible to tell their number or their positions, whereas in the HB+ protocol any modification of a bit of a directly affects the response z, which consists of only one bit.

With regard to the performance of the method of the invention, it should be observed that, the response z on each iteration being written on m bits, it is essentially as if m iterations were effected in only one iteration.

As a result of this, in a first extreme situation, it is possible to reduce the number of iterations by a factor of the order of m, and thus in practice to limit the number of iterations to only one, which retains the performance of the HB+ protocol in terms of the false alarm rate but reduces the number of bits exchanged from r(2n+1) to (2n+m), i.e. from 44 900 bits to 576 bits, with n=224 and m=128, which represents a considerable improvement. This example demonstrates fully the benefit of the invention of limiting to 1 the number r of iterations, which is impossible to envisage for the HB+ protocol.

In a second extreme situation, the number of iterations is the same. The quantity of data exchanged is then slightly increased, but the false alarm rate becomes insignificant.

Of course, a realistic situation has to be chosen between these two extreme situations, with both a reduced false alarm rate and a reduced number of bits exchanged between the microchip and the microchip reader.

Be this as it may, it is clear that the present invention offers better performance than the HB+ protocol in terms of the false alarm rate and the quantity of information to be exchanged between the two entities concerned.

In one particular implementation of the invention, said matrices X and Y are Toeplitz matrices. It is shown in more detail below that this advantageous feature limits the storage capacity of the microchips and the microchip readers to (n+m−1) instead of n×m if other matrices were to be chosen. Another advantage is the simplified calculation of the products aX and bY.

The invention also provides an entity to be authenticated by a verification entity, said entities sharing a pair of secret keys X and Y, notable in that said entity to be authenticated includes means for storing secret keys X and Y consisting of n×m (n, m>1) binary matrices, means for communicating with the verification entity, and calculation means adapted to effect r times (r≧1) the steps of:

drawing at random and sending to the verification entity a binary vector b of n bits;

receiving from the verification entity a binary vector a of n bits;

drawing at random a noise binary vector c of m bits, each of said m bits being equal to 1 with a probability η less than ½, and calculating and sending to the verification entity a response vector z of m bits equal to z=aX⊕bY⊕c.

The invention also provides a computer program including program instructions for executing the steps effected by said entity to be authenticated when said program is executed by a computer forming part of said calculation means of the entity to be authenticated.

The invention further provides a verification entity sharing a pair of secret keys X and Y with an entity to be authenticated, notable in that said verification entity includes means for storing secret keys X and Y consisting of n×m (n, m>1) binary matrices, means for communicating with the entity to be authenticated, and calculation means adapted to effect r times (r≧1) the steps of:

receiving from the entity to be authenticated a binary vector b of n bits;

drawing at random and sending to the entity to be authenticated a binary vector a of n bits;

receiving from the entity to be authenticated a response vector z of m bits;

calculating the Hamming weight of an error vector e=z⊕aX⊕bY and accepting the authentication if the Hamming weights of the r error vectors e satisfy a relationship of comparison to a parameter (T, t) that is a function of a predetermined probability η.

The invention finally provides a computer program including program instructions for executing the steps effected by said verification entity when said program is executed by a computer forming part of said calculation means of said verification entity.

BRIEF DESCRIPTION OF THE DRAWINGS

The following description is given by way of non-limiting example with reference to the appended drawings and explains what the invention consists in and how it can be reduced to practice.

FIG. 3 is a diagram of an entity to be authenticated by the FIG. 2 method.

FIG. 4 is a diagram of a verification entity for authenticating the FIG. 3 entity using the FIG. 2 method.

DETAILED DESCRIPTION

Figure 1:
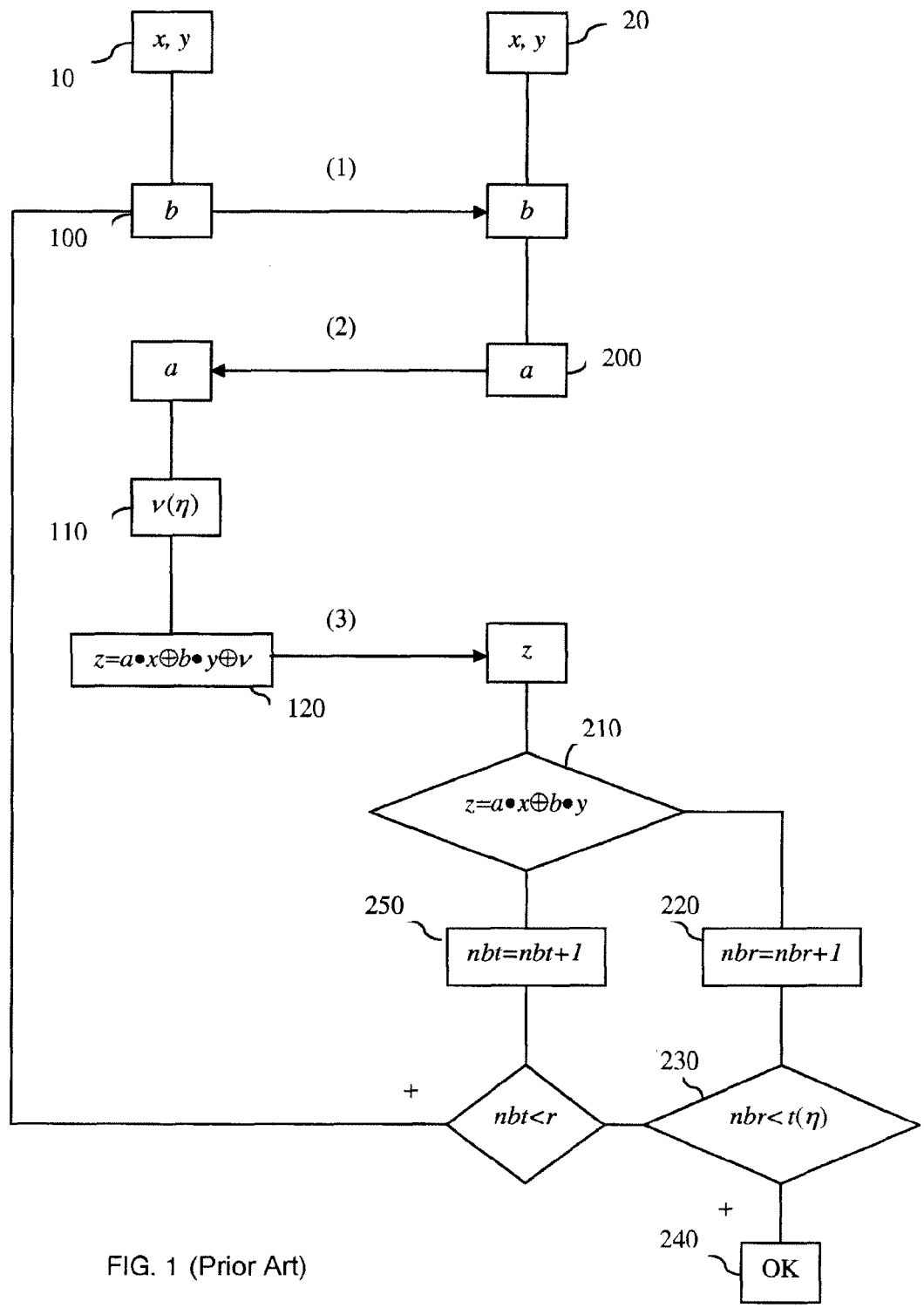
FIG. 1 is a flowchart illustrating a known exchange of data under the HB+ protocol between the entity to be authenticated and the verification entity.
Figure 2:
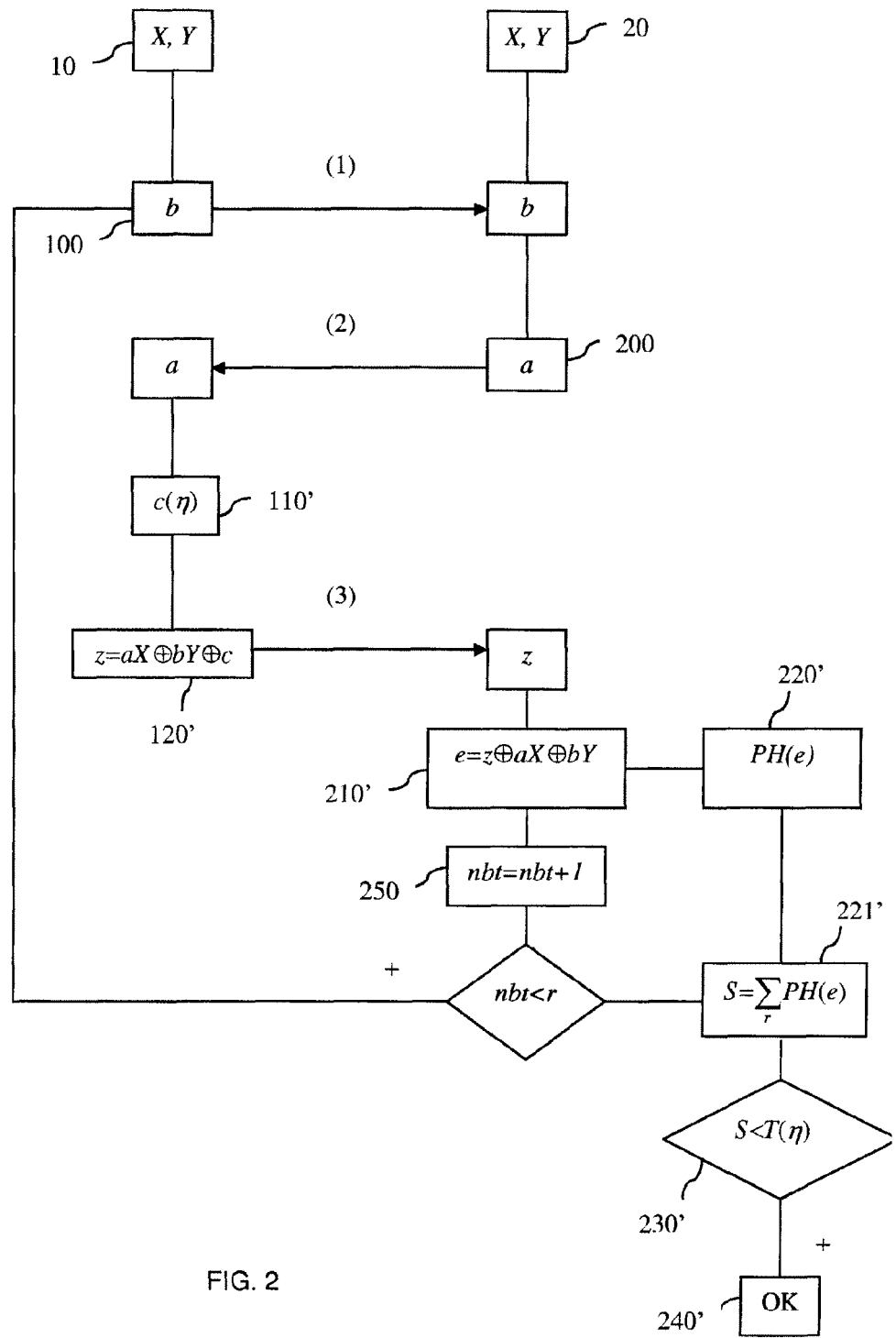
FIG. 2 represents exchanges between the entity to be authenticated and the verification entity during the method of the invention.

FIG. 2 shows an authentication method enabling a verification entity, for example a contact or contactless microchip reader, to verify the identity of an entity to be authenticated that can, in this example, be an RFID microchip.

The method shown in FIG. 2 is a so-called symmetrical method in which the two entities (microchip and microchip reader) share the same secret keys. These keys, designated X and Y, are n×m (n, m>1) binary matrices comprising n rows and m columns. The secret keys X and Y are stored in storage means 10 of the microchip and storage means 20 of the microchip reader (see FIG. 2 and FIGS. 3 and 4).

The method of the invention is structured into steps repeated r times (r≧1). The expression "r times" indicates that exchanges between the microchip and the microchip reader can be effected sequentially in r iterations of three passes, as indicated in FIG. 2, where the number nbt of iterations is incremented by 1 on each iteration by a counter (block 250), or in parallel on three passes, each pass comprising transmission of r items of data from one entity to the other.

In the FIG. 2 example, the microchip 1 draws at random in each iteration (block 100) and sends (1) to the microchip reader 2 a one-row binary vector b of n bits. The microchip reader 2 then sends (2) to the microchip 1 a challenge a (block 200) that is a one-row binary vector of n bits drawn at random. The binary vectors b and a are drawn at random in accordance with a uniform distribution of the 0 and 1 bits.

In response to the challenge a, the microchip 1 sends (3) to the microchip reader 2 a one-row binary vector z of m bits equal to the modulo 2 sum z=aX⊕bY⊕c (block 120'), where c is a one-row noise binary vector of m bits, drawn at random (block 110') by the microchip 1 in accordance with a probability law ensuring that each bit of c is equal to 1 with an equal probability or less than or equal to a parameter η less than ½. To this end, each bit of the noise vector c can be drawn at random independently of the others, in accordance with a Bernoulli law with parameter η<½. The noise vector c can also be drawn at random from all the vectors of m bits for which the sum of the bits (Hamming weight) is not greater than the value η×m with η<½. Of course, the noise vector c can be drawn at random by the microchip at the same time as it draws at random the binary vector b that, as should be remembered, is used to mask active attacks on the vector a.

On each iteration, the microchip reader 2 calculates (block 210') an error vector e of m bits equal to e=z⊕aX⊕bY, where z is the response vector sent by the microchip 1, and the Hamming weight PH(e) (block 220') of the error vector e obtained in this way.

After r iterations, acceptance or rejection of authenticating the microchip 1 by the microchip reader 2 is determined from the r Hamming weights PH(e) of the error vectors e obtained in each iteration and comparison thereof to a parameter that is a function of the probability η.

Several strategies are then possible.

A first strategy, represented in FIG. 2, is to accept authentication (block 240') if and only if the sum S of the Hamming weights of the r error vectors e (block 221') is below a given threshold T (block 230'), equal for example to r(η+ε)m, where ε is a margin below ½, possibly zero.

A second strategy is to accept authentication if and only if the Hamming weight of the error vector e obtained in each iteration is below a threshold t.

Finally, a third strategy is to accept authentication if and only if the Hamming weight of the error vector e obtained in each iteration is equal to a value t.

In the second and third strategies, the parameter t has the value (η+ε)m, where ε is a margin less than ½, possibly zero.

Taking r=1, n=256, m=128, η=0.25 and with the noise vector c drawn at random from the binary vectors of length 128 and of Hamming weight 32, i.e. η×m, authentication of the microchip is accepted under the third of the above strategies if and only if the weight of the error vector e in each iteration is exactly equal to 32, here with ε=0.

In this example, it can be seen that the total length of the exchanges is only 640 bits, i.e. (2n+m) bits. In contrast, it can be seen that the false alarm rate is strictly zero and that the false positive rate for an attack that tries a random value of z is close to $10^{-8}$, which is entirely acceptable in practice.

In FIG. 2, the sequence of exchanges between the microchip 1 and the microchip reader 2 is as follows: sending b to the microchip reader, sending a to the microchip, random drawing of c by the microchip, and sending of z to the microchip reader. It must nevertheless be noted that a different sequence could equally well be used, namely: sending a to the microchip, random drawing of b and c by the microchip, and sending b and z to the microchip reader. This sequence has the advantage of reducing the number of exchanges.

In an implementation that greatly reduces the quantity of memory necessary for storing the matrices X and Y and the complexity of the calculations to be effected by the microchip and the verification entity, each of the matrices X and Y can be selected from within a strict subset of all n×m matrices defined in the microchip using a plurality of bits strictly less than n×m. For example, the quantity of memory necessary to store each matrix can be reduced to only (n+m−1) when X and Y are Toeplitz matrices, namely matrices with constant coefficients along the diagonals with all the coefficients thereof being entirely determined by the coefficients of the first row and the first column. If X is a Toeplitz matrix and if $x_{i,j}$ is the coefficient of the $i^{th}$ row and the $j^{th}$ column, $x_{i,j}$ is equal to $x_{i-j+1,1}$ if i is greater than or equal to j, and otherwise equal to $x_{1,j-i+1}$.

The following implementation computes highly efficiently and bit by bit the product of a binary vector, for example a, and a Toeplitz matrix, for example X, defined by means of the (n+m−1) coefficients of its first row and its first column using two registers of m bits, one to calculate the current row of the matrix and the other, initialized to 0, to accumulate the partial results of the vector-matrix product. The first register is initialized with the first row of X, after which each of the bits of the vector a is processed in the following manner: if the current bit of a is equal to 1, the value of the current row of X is combined bit by bit using the exclusive-OR operator with the current value of the partial result accumulation register. Otherwise, the current value of this register is not modified. Either way, if the current row is not the last row of the matrix X, the register containing the current row of that matrix is updated by rotating the content of this register one bit toward the right, followed by copying into the leftmost cell of this register the coefficient of the first column corresponding to the new current row.

As shown in FIG. 3, the microchip 1 to be authenticated by the microchip reader 2, these two entities sharing a pair of secret keys X and Y, includes means 10 for storing the secret keys X and Y consisting of n×m (n, m>1) binary matrices, means 12 for communicating with the microchip reader 2, and calculation means 11 adapted to execute r times (r≧1) the steps of the method described with reference to FIG. 2:

drawing at random and sending to the microchip reader 2 a binary vector b of n bits;

receiving from the microchip reader 2 a binary vector a of n bits;

drawing at random a noise binary vector c of m bits, each of said m bits being equal to 1 with a probability $\eta$ less than ½, and calculating and sending to the microchip reader 2 a response vector z of m bits equal to $z=aX \oplus bY \oplus c$.

Similarly, there can be seen in FIG. 4 a microchip reader 2 for authenticating a microchip 1, including means 20 for storing the secret keys X and Y consisting of n×m (n, m>1) binary matrices, means 22 for communicating with the microchip 1 to be authenticated, and calculation means 21 adapted to execute r times (r≧1) the steps of the method described with reference to FIG. 2:

receiving from the microchip 1 to be authenticated a binary vector b of n bits;

drawing at random and sending to the microchip 1 a binary vector a of m bits;

receiving from the microchip 1 a response vector z of m bits;

calculating the Hamming weight of an error vector $e=z \oplus aX \oplus bY$ and accepting authentication if the Hamming weights of the r error vectors e satisfy a relation of comparison to a parameter that is a function of the probability $\eta$. In particular, authentication is accepted if the sum of the Hamming weights of the error vectors e obtained over the r iterations is less than a parameter equal to a threshold T, as described in detail above.

The invention claimed is:

1. A method of authenticating an entity by a verification entity, said method comprising steps repeated r times (r>1) of:

the entity to be authenticated and the verification entity, said entities sharing a pair of secret keys X and Y, wherein said secret keys X and Y are n×m (n, m>1) binary matrices, exchanging binary vectors a and b of n bits respectively drawn at random by the verification entity and the entity to be authenticated and the entity to be authenticated drawing at random a noise binary vector c of m bits, each of said m bits being equal to 1 with a probability $N$ less than ½, and calculating and sending to the verification entity a response vector z of m bits equal to $z=aX \oplus bY \oplus c$;

the verification entity calculating, using a processor of the verification entity, the Hamming weight of an error vector $e=z \oplus aX \oplus bY$; and then accepting the authentication if the Hamming weights of the r error vectors e satisfy a relationship of comparison to a parameter that is a function of the probability $N$.

2. A method according to claim 1, wherein said relationship of comparison is such that the sum of the Hamming weights of the error vectors e obtained over the r iterations is less than a parameter equal to a threshold T.

3. A method according to claim 2, wherein the threshold T has the value $r(\eta+\epsilon)m$ where $\epsilon$ is a margin less than ½.

4. A method according to claim 1, wherein said comparison relationship is such that the Hamming weight of the error vector e obtained in each iteration is less than a parameter equal to a threshold t.

5. A method according to claim 1, wherein said comparison relationship is such that the Hamming weight of the error vector e obtained in each iteration is equal to a parameter equal to a threshold t.

6. A method according to claim 4, wherein t has the value $(\eta+\epsilon)m$ where $\epsilon$ is a margin less than ½.

7. A method according to claim 1, wherein said matrices X and Y are Toeplitz matrices.

8. A microchip to be authenticated by a microchip reader, wherein said microchip to be authenticated comprises:

a storage unit that stores a pair of secret keys X and Y consisting of n×m (n, m>1) binary matrices, wherein the microchip and the microchip reader share the pair of secret keys X and Y;

a communication unit that communicates with the microchip reader, and a calculation unit adapted to effect r times (r≧1) the steps of:

drawing at random and sending to the microchip reader a binary vector b of n bits;

receiving from the microchip reader a binary vector a of n bits;

drawing at random a noise binary vector c of m bits, each of said m bits being equal to 1 with a probability $N$ less than ½, and calculating and sending to the microchip reader a response vector z of m bits equal to $z=aX \oplus bY \oplus c$.

9. A non-transitory computer readable medium having program instructions recorded thereon for executing the method of claim 1 when said program instructions are executed by a computer.

10. A microchip reader comprising: a storage unit that stores a pair of secret keys X and Y consisting of n×m (n, m>1) binary matrices, wherein the microchip reader shares the pais of secret keys X and Y with a microchip to be authenticated;

a communication unit that communicates with the microchip to be authenticated; and a calculation unit adapted to effect r times (r>1) the steps of:

receiving from the microchip to be authenticated a binary vector b of n bits;

drawing at random and sending to the microchip to be authenticated a binary vector a of n bits;

receiving from the microchip to be authenticated a response vector z of m bits; and calculating the Hamming weight of an error vector $e=z \oplus aX \oplus bY$ and accepting the authentication if the Hamming weights of the r error vectors e satisfy a relationship of comparison to a parameter that is a function of a predetermined probability $N$.

* * * * *